United States Patent
Tecco

(10) Patent No.: US 10,934,603 B2
(45) Date of Patent: Mar. 2, 2021

(54) INLINE LASER-BASED SYSTEM AND METHOD FOR THERMAL TREATMENT OF CONTINUOUS PRODUCTS

(71) Applicant: ILLINOIS TOOL WORKS INC., Glenview, IL (US)

(72) Inventor: Dorival Goncalves Tecco, Sao Paulo (BR)

(73) Assignee: Illinois Tool Works Inc., Glenview, IL (US)

( * ) Notice: Subject to any disclaimer, the term of this patent is extended or adjusted under 35 U.S.C. 154(b) by 387 days.

(21) Appl. No.: 15/539,298

(22) PCT Filed: Jan. 9, 2015

(86) PCT No.: PCT/US2015/010923
§ 371 (c)(1),
(2) Date: Jun. 23, 2017

(87) PCT Pub. No.: WO2016/111705
PCT Pub. Date: Jul. 14, 2016

(65) Prior Publication Data
US 2017/0349968 A1    Dec. 7, 2017

(51) Int. Cl.
B23K 26/352    (2014.01)
C21D 9/46      (2006.01)
(Continued)

(52) U.S. Cl.
CPC .......... *C21D 9/525* (2013.01); *B23K 26/0093* (2013.01); *B23K 26/0626* (2013.01); *B23K 26/073* (2013.01); *B23K 26/0846* (2013.01); *B23K 26/352* (2015.10); *B23K 26/703* (2015.10); *C21D 1/613* (2013.01);
(Continued)

(58) Field of Classification Search
None
See application file for complete search history.

(56) References Cited

U.S. PATENT DOCUMENTS

| | | |
|---|---|---|
| 4,649,256 A | 3/1987 | Minamida et al. |
| 4,772,338 A | 9/1988 | Fukuda |

(Continued)

FOREIGN PATENT DOCUMENTS

| | | |
|---|---|---|
| CN | 101044597 | 9/2007 |
| CN | 102618846 | 8/2012 |

(Continued)

OTHER PUBLICATIONS

Canadian Office Action Appln No. 2,971,842 dated Jul. 24, 2019 (12 pgs.).

(Continued)

*Primary Examiner* — George Wyszomierski
(74) *Attorney, Agent, or Firm* — McAndrews, Held & Malloy, Ltd.

(57) ABSTRACT

An inline thermal treatment system for thermally treating a continuous product includes a housing comprising a first opening and second opening respectively configured to allow the continuous product to enter and to exit the housing. The system includes at least one laser coupled to a laser power source and configured to output at least one laser beam that impinges upon and heats the portion of the continuous product.

21 Claims, 8 Drawing Sheets

(51) Int. Cl.
*C21D 9/52* (2006.01)
*C21D 9/04* (2006.01)
*C21D 9/08* (2006.01)
*B23K 26/08* (2014.01)
*B23K 26/70* (2014.01)
*B23K 26/00* (2014.01)
*B23K 26/06* (2014.01)
*B23K 26/073* (2006.01)
*C21D 1/613* (2006.01)

(52) U.S. Cl.
CPC ............... *C21D 9/04* (2013.01); *C21D 9/08* (2013.01); *C21D 9/46* (2013.01); *C21D 9/52* (2013.01)

(56) References Cited

U.S. PATENT DOCUMENTS

| | | | |
|---|---|---|---|
| 5,938,953 A * | 8/1999 | Jurca | B23K 26/032 |
| | | | 219/121.63 |
| 6,420,675 B1 * | 7/2002 | Lizotte | B23K 26/04 |
| | | | 219/121.7 |
| 7,585,791 B2 | 9/2009 | Tanaka | |
| 7,649,156 B2 | 1/2010 | Lee | |
| 9,284,503 B2 | 3/2016 | De Graffenried, Sr. | |
| 2003/0113481 A1 | 6/2003 | Huang | |
| 2005/0127843 A1 | 6/2005 | Koulik | |
| 2007/0128375 A1 | 6/2007 | Begounov | |
| 2008/0179304 A1 | 7/2008 | Osako | |
| 2009/0230105 A1 | 9/2009 | Estepa Millan | |
| 2010/0282722 A1 * | 11/2010 | Ramsayer | B23K 26/0823 |
| | | | 219/121.64 |
| 2010/0326974 A1 | 12/2010 | Ota et al. | |
| 2011/0210115 A1 | 9/2011 | Lauer | |
| 2014/0311409 A1 | 10/2014 | Asuma | |
| 2017/0022584 A1 * | 1/2017 | Domınguez | B23K 26/0604 |

FOREIGN PATENT DOCUMENTS

| | | |
|---|---|---|
| JP | S6021825 A | 11/1985 |
| WO | 9005612 | 5/1990 |
| WO | 2005080686 A1 | 9/2005 |

OTHER PUBLICATIONS

Int'l Search Report and Written Opinion PCT/US2015/010921 dated Sep. 29, 2015.
PCT ISR and Written Opinion dated Oct. 7, 2015 (12 pages) for PCT Patent Application No. PCT/US2015/010923.

* cited by examiner

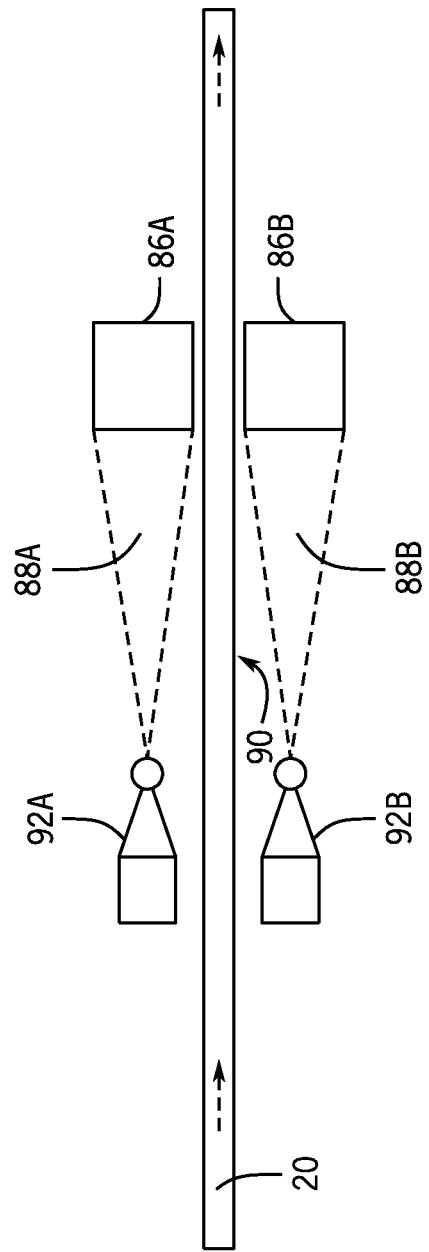

though as the portions of the product disposed beneath, closer to the temporary holder. As such, this method does not allow for uniform, controlled heating of the continuous product.

INLINE LASER-BASED SYSTEM AND METHOD FOR THERMAL TREATMENT OF CONTINUOUS PRODUCTS

The present application is a National Phase Entry of PCT International Application No. PCT/US2015/010923, which was filed on Jan. 9, 2015, the contents of which are hereby incorporated by reference.

BACKGROUND

The present disclosure relates generally to systems and methods for thermally treating continuous materials and, more specifically, to systems and methods for rapid, inline thermal treatment of continuous products.

A continuous product, as used herein, refers to a product, such as a sheet, strip, or wire, that is manufactured using a continuous production system. For example, during the manufacture of a continuous product, a continuous material may be provided from a cylinder (e.g., a spool or reel) and may proceed through any number of inline manufacturing steps, one directly after another, such that the output of one step serves as the input to the following step, until the continuous product is fully formed and packaged. It is not uncommon for one or more of these manufacturing steps to inadvertently or intentionally impart organics to the surface of the continuous product. These contaminates may include, for example, temporary coatings, lubricants, and other organic compounds. It may be desirable to remove these organic contaminates to avoid contamination between manufacturing steps or before the product is packaged to improve the appearance and usability of the continuous product.

One method of removing these organic contaminants from the surface of a continuous product involves using organic solvents (e.g., fluorocarbons) to dissolve and wash these contaminates from the surface of the product. However, using organic solvents to clean the surface of the product has several disadvantages. For example, these disadvantages include the amount of cleaning time required as well as the additional cost and equipment associated with managing organic solvent fumes and/or recycling the organic solvent.

Another method of removing these organic contaminants from the surface of a continuous product involves batch thermal treatment of the continuous product as an intermediate process after production and prior to packaging. For this method, the continuous product may be loaded onto a temporary holder (e.g., cylinder, bobbin, or reel) then placed within a furnace to heat the product to a sufficient temperature to remove the organic contaminates from the surface. However, this method also has several disadvantages, including the additional time, cost, and equipment associated with: loading the continuous product onto the temporary holder, transporting the product to the furnace, heating the furnace to a suitable temperature to remove the organic contaminates, allowing the product to cool, removing the product from the furnace, and then transferring the continuous product from the temporary holder to another holder (e.g., cylinder, bobbin, or reel) for packaging. Additionally, this method consumes a substantial amount of energy, in the form of electricity and/or fuel, to heat the entire interior of the furnace to a suitable temperature to remove the organic contaminates from the surface of the continuous product. Furthermore, since the continuous product is loaded onto the temporary holder before being loaded in the furnace, the outer portions of the product will not heat up at the same rate as the portions of the product disposed beneath, closer to the temporary holder. As such, this method does not allow for uniform, controlled heating of the continuous product.

BRIEF DESCRIPTION

The present disclosure relates generally to systems and methods for the inline thermal treatment of continuous products. More specifically, the present disclosure is directed toward systems and methods for the inline thermal treatment of conductive and non-conductive continuous products using laser heating.

In an embodiment, an inline thermal treatment system for thermally treating a continuous product includes a housing comprising a first opening and second opening respectively configured to allow the continuous product to enter and to exit the housing. The system includes at least one laser coupled to a laser power source and configured to output at least one laser beam that impinges upon and heats the portion of the continuous product.

In another embodiment, a method includes advancing a continuous product through a housing of a thermal treatment system and laser heating a portion of the continuous product by impinging the portion of the continuous product with one or more laser beams produced by one or more lasers of the thermal treatment system. The method includes supplying at least one gas flow to modify an atmosphere near the continuous product during and/or after laser heating of the continuous product.

In another embodiment, a continuous production system for manufacturing a continuous product includes an inline production system configured to receive a continuous material and to output a continuous product. The system includes an inline thermal treatment system configured to receive the continuous product from the inline production system and to output a thermally treated continuous product. The inline thermal treatment system includes at least one laser disposed within a housing and configured to produce at least one laser beam, wherein the at least one laser beam is configured to impinge upon and heat a portion of the continuous product. The system includes a controller comprising a memory and a processor, wherein the controller is configured to control the inline production system and the inline thermal treatment system based on instructions stored in the memory.

DRAWINGS

These and other features, aspects, and advantages of the present technique will become better understood when the following detailed description is read with reference to the accompanying drawings in which like characters represent like parts throughout the drawings, wherein:

FIGS. 4-8 are schematic diagrams illustrating various positions and orientations of plasma arcs in relation to a continuous product for the inline plasma thermal treatment system of FIG. 3, in accordance with embodiments of the present approach;

Figure 9:
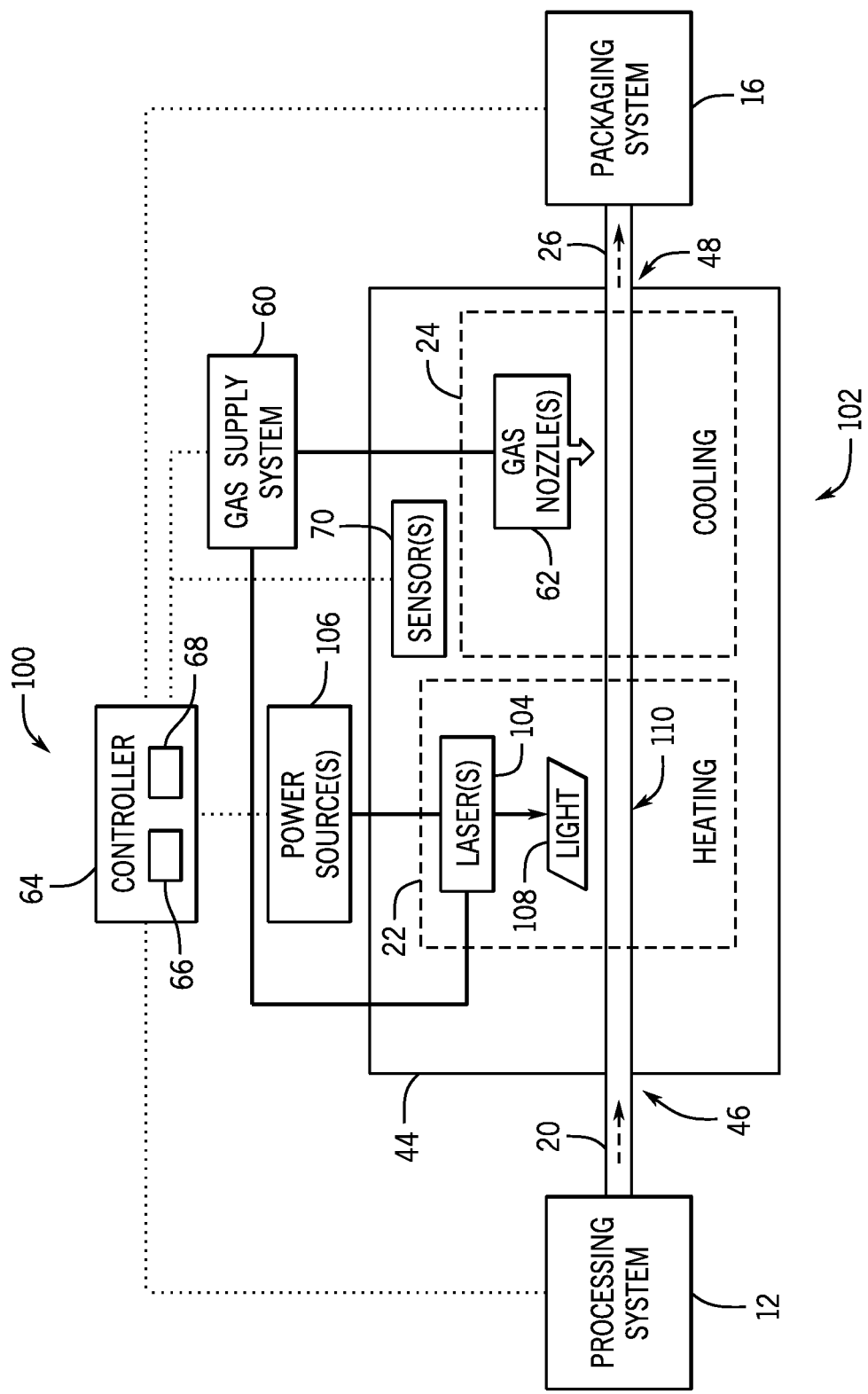
Figure 11:
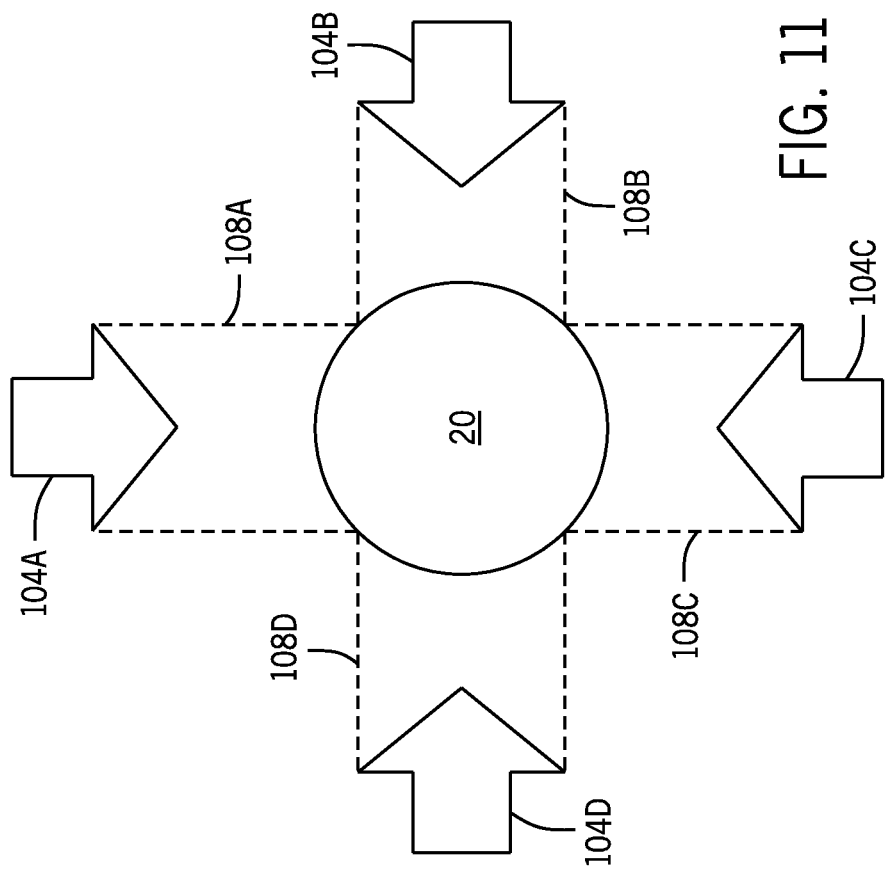
Figure 10:
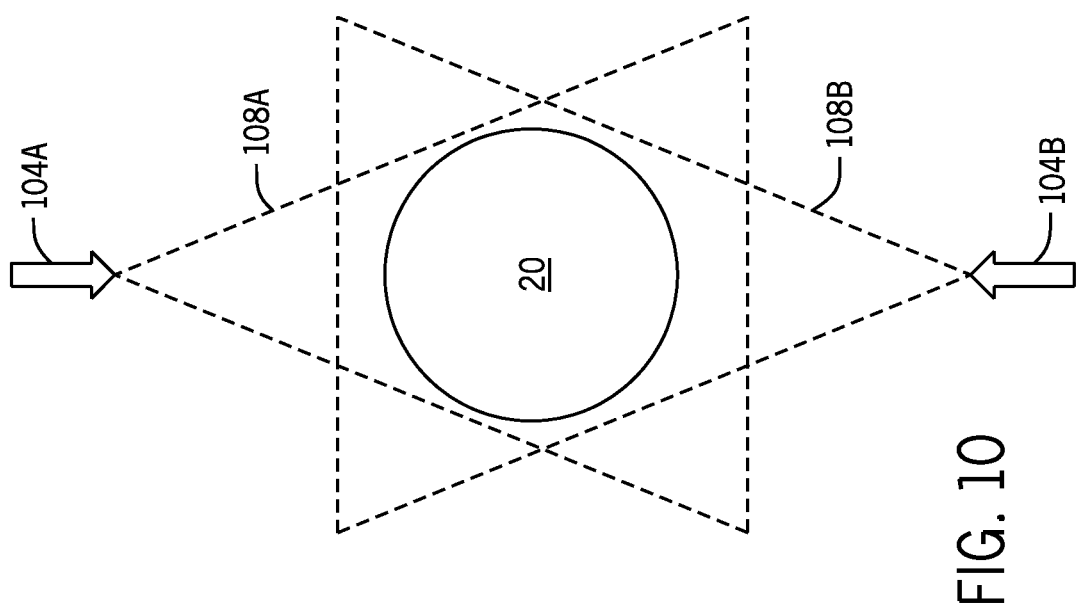

FIG. 9 is a schematic diagram illustrating a portion of a continuous production system having an inline laser thermal treatment system, in accordance with embodiments of the present approach; and FIGS. 10 and 11 are schematic diagrams illustrating various positions and orientations of laser beams in relation to a continuous product for the inline laser thermal treatment system of FIG. 9, in accordance with embodiments of the present approach.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed toward systems and methods for inline thermal treatment of continuous products. Continuous products, as discussed herein, include any continuously produced structure, such as a sheet or plate, a strip, a solid wire, or a tubular wire made from a conductive material (e.g., steel, iron or low-alloy ferrous material, high-alloy ferrous material, cobalt-based alloy, nickel-based alloy, or copper-based alloy) or a non-conductive material (e.g., carbon-based products, carbon-fiber products, semiconductor products, or ceramic products). As used herein, a conductive continuous product generally has a resistivity less than or equal to approximately 10 Ohm·meters, and a non-conductive continuous product generally has a resistivity greater than or equal to approximately $1 \times 10^{14}$ Ohm·meters. Thermal treatment, as used herein, refers to subjecting the continuous product to at least one thermal cycle, wherein the continuous product is first rapidly heated and then subsequently cooled. It should be understood that continuous products may be generally described as having a direction of motion that coincides with the length (e.g., longest dimension) of the continuous product. As such, it may be noted that the terms upstream and downstream are used herein to describe the relative positions of two elements of a continuous production system or thermal treatment system relative to the motion of the continuous product through the continuous production system. Certain elements of the thermal treatment systems may be described as having longitudinal positions relative to the continuous product, which are positions along the path that the continuous product traverses through the thermal treatment system. Further, certain elements of the thermal treatment system may be described as having radial positions relative to a continuous product (e.g., a continuous wire product having a circular cross-section), which are radial positions about the axis that coincides with the length and/or motion of the continuous product as it traverses the thermal treatment system (e.g., the axis extending through the center and along the length of a continuous wire product).

The disclosed thermal treatment systems may be positioned inline with the production and/or packaging equipment of the continuous production system, which provides substantial advantages over batch thermal treatment in terms of time and operational cost. As set forth above, the surfaces of continuous products may include organic contaminants (e.g., lubricants and/or coatings) from various processing steps, and these organic contaminates may be removed (e.g., degraded and/or vaporized) via the disclosed inline thermal treatment systems. Additionally, the disclosed thermal treatment systems may be used to produce a physical transformation, such as a phase change or a chemical reaction, inside or on the surface of certain types of continuous products. As such, in addition to cleaning the surfaces of the continuous product, certain disclosed thermal treatment systems may be used to thoroughly dry a continuous product of solvent or moisture, to alter the microstructure of a continuous product via sintering, and/or to form a glassy surface layer on a continuous product. Furthermore, in certain embodiments, the disclosed thermal treatment systems may utilize resistive heating, plasma heating, or laser heating to thermally treat a variety of conductive or non-conductive continuous products. It may be appreciated that each of these heating methods enables direct, rapid heating of a portion of the continuous product.

Figure 1:
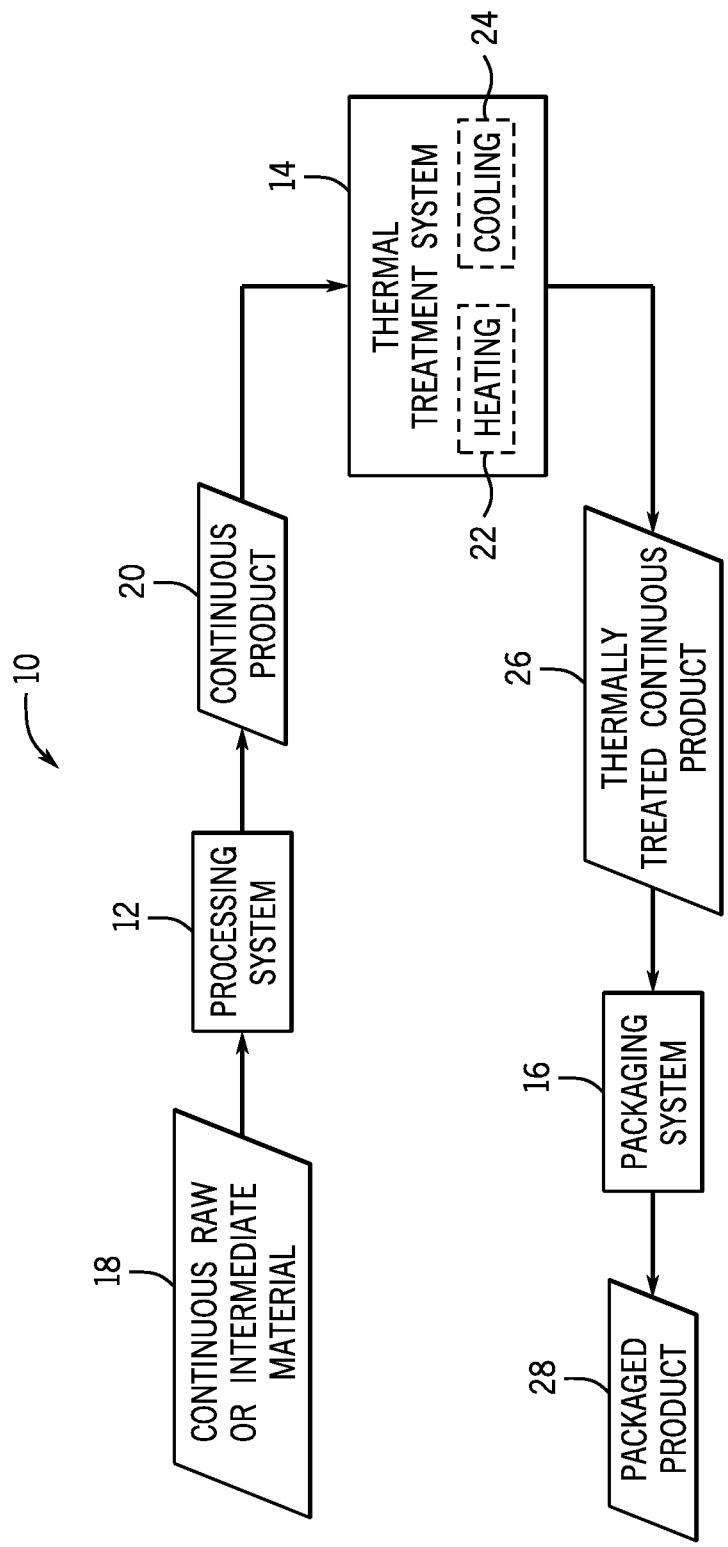
FIG. 1 is a schematic illustrating a continuous production system having an inline thermal treatment system, in accordance with embodiments of the present approach.

FIG. 1 is a schematic illustrating a continuous production system 10, in accordance with an embodiment of the present approach. The illustrated continuous production system 10 includes three systems: an inline processing system 12, an inline thermal treatment system 14, and an inline packaging system 16. The processing system 12 receives as input a continuous raw or intermediate material 18 and performs one or more manipulations (e.g., extruding, bending, rolling, drawing, etc.) of the material 18 to produce a continuous product 20. The continuous product 20 is then introduced into the thermal treatment system 14 in which the continuous product 20 is subjected to at least one thermal cycle (e.g., involving rapid heating in a heating zone 22 and subsequent cooling in a cooling zone 24 of the thermal treatment system 14) to yield the thermally treated continuous product 26. The thermally treated continuous product 26 is then introduced into the packaging system 16, in which the thermally treated continuous product 26 is packaged, yielding a packaged product 28 suitable for distribution and/or retail. It may be appreciated that the illustrated continuous production system 10 is merely provided as an example and, in other embodiments, the continuous production system 10 may include other systems or arrangements without negating the present approach. For example, in other embodiments, a thermal treatment system 14 may be disposed between multiple processing systems 12 to clean the surface of the continuous product 20 (or a continuous intermediate product) to limit or prevent contamination of the downstream processing systems 12.

One specific example of a continuous production system 10 presently contemplated is a continuous production system 10 for the manufacture of tubular welding wires. It will be appreciated that, while the present example relates to the production of tubular welding wires, other continuously produced products, such as other wires, strips, sheet, or plates that are made of metals, ceramics, or semiconductors may utilize the inline thermal treatment techniques described herein. For this example, the continuous raw or intermediate material 18 may be a continuous metal strip that may be fed into the processing system 12 from a spool or cylinder. It should be appreciated that, in certain embodiments, when a first spool of the metal strip is depleted, a second spool of the of the metal strip may be loaded, and the end portion of the metal strip from the first spool may be butt welded to the beginning portion of the metal strip of the second spool to provide a substantially continuous supply of the metal strip to the continuous production system 10.

Continuing through the example, the processing system 12 receives the continuous raw or intermediate material 18 (e.g., the metal strip), and performs one or more manipulations of the metal strip to form the continuous product 20 (e.g., a welding wire). These manipulations may involve, for example, tensioning, shaping, bending, rolling, extruding, compressing, and/or texturing the metal strip. Additionally, these manipulations may include adding a granular core material to the partially shaped metal strip, compressing the metal strip around the granular core material, or any other suitable manipulation to form the metal strip into a welding wire. It may be appreciated that lubricants added to the surfaces of the metal strip may facilitate these manipulations.

Next, continuing through the example, the thermal treatment system 14 receives the continuous product 20 (e.g., the tubular welding wire), and applies one or more heating and cooling cycles to thermally treat the welding wire. In certain embodiments, the primary purpose of the thermal treatment may be to remove any organic lubricants or coatings from the surface of the welding wire. However, in certain embodiments, the thermal treatment may also be effective at removing residual moisture or organic solvents from the welding wire (e.g., from the metal strip or from the granular core of the welding wire), which may improve the performance and shelf-life of certain welding wires. Additionally, in certain embodiments, the thermal treatment may be used to sinter the granular core of a welding wire. As such, it may be appreciated that, in addition to removing undesired organics from the surface of welding wires, the thermal treatment provided by the thermal treatment system 14 may, in certain embodiments, be useful to intentionally alter the physical and/or chemical nature of the welding wire as a part of the continuous production system 10.

Next, continuing through the example, the packaging system 16 receives the thermally treated continuous product 26 (e.g., the thermally treated welding wire) from the thermal treatment system 14. For example, the packaging system 16 may, in certain embodiments, cut the welding wire to particular lengths that are loaded onto spools for distribution and/or retail. In certain embodiments, the packaging system 16 may alternatively package the welding wire into coils, boxes, drums, or other suitable packages or dispensing mechanisms.

Accordingly, the presently disclosed inline thermal treatment system 14 may be useful to the manufacture of a continuous product. As set forth below, the disclosed thermal treatment system 14 may be implemented using one of three different heating methods, each with utility for certain types of continuous products. The heating methods disclosed include: resistive heating (for conductive continuous products), plasma heating (for conductive and non-conductive continuous products), and laser heating (for conductive and non-conductive continuous products). Each of these embodiments is discussed in detail below.

Resistive Heating

In certain embodiments of the present approach, the inline thermal treatment system 14 may use resistive heating to thermally treat electrically conductive continuous products. Resistive heating (also known as Joule heating or ohmic heating) refers to the heat released as a result of current flowing through a conductive material. For embodiments of the thermal treatment system 14 that use resistive heating, electrodes are generally placed along the surface of the continuous product so that, when a suitable electrical bias (e.g., voltage) is applied to the electrodes, current traverses and resistively heats the portion of the continuous product disposed between the electrodes.

Figure 2:
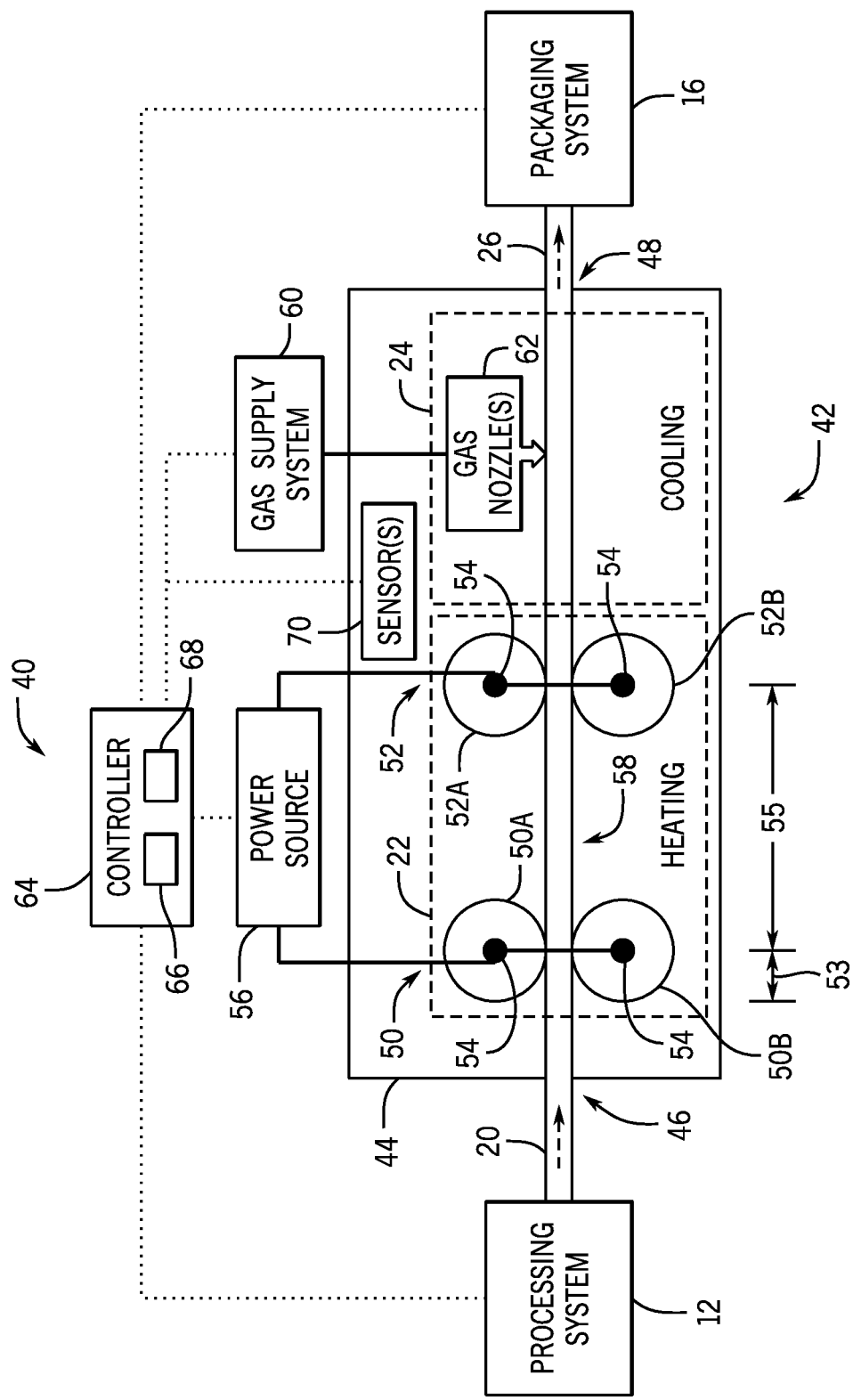
FIG. 2 is a schematic diagram illustrating a portion of a continuous production system having an inline resistive heating thermal treatment system, in accordance with embodiments of the present approach.

FIG. 2 is a schematic diagram illustrating a portion of a continuous production system 40 that includes an embodiment of an inline resistive heating thermal treatment system 42, in accordance with embodiments of the present approach. Similar to FIG. 1, the portion of the continuous production system 40 illustrated in FIG. 2 has the thermal treatment system 42 disposed downstream of the processing system 12 and upstream of the packaging system 16 within the continuous production system 40. As such, for the illustrated continuous production system 40, the continuous product 20 enters the thermal treatment system 42, traverses the heating zone 22, traverses the cooling zone 24, and then exits the thermal treatment system 42 as the thermally treated continuous product 26. As such, the embodiment of the thermal treatment system 42 illustrated in FIG. 2 includes a housing 44 that contains the internal components of the thermal treatment system 42 and includes a first opening 46, through which the continuous product 20 enters the thermal treatment system 42, and a second opening 48, through which the thermally treated continuous product 26 exits the thermal treatment system 42. It will be appreciated that the first and second openings 46 and 48 may be shaped appropriately to accommodate the continuous product continuously moving through the housing 44. For example, in situations where tubular welding wires constitute the continuous product 20, the first and second openings 46 and 48 may be generally circular openings 46 and 48 through which the tubular welding wires may continuously move. In other embodiments, where the continuous products are sheets or strips, the first and second openings 46 and 48 may be generally rectangular openings 46 and 48 through which the sheets or strips may continuously move. Furthermore, in certain embodiments, the first and second openings 46 and 48 may be only slightly larger than the dimensions of the continuous product 20 such that as one or more gas flows are provided into the housing 44, as discussed below, only a small gas flow can escape the housing 44 between the continuous product 20 and the first and second openings 46 and 48. In still other embodiments, the thermal treatment system 42 may not include the housing 44.

The thermal treatment system 42 also includes a first electrode 50 and a second electrode 52 disposed within the housing 44. In particular, the first and second electrodes 50 and 52 illustrated in FIG. 2 are rotary wheel electrodes that are mechanically biased against the continuous product 20. Further, the illustrated rotary wheel electrodes 50 and 52 each include two wheel portions. That is, the first rotary wheel electrode 50 includes a top wheel portion 50A and a bottom wheel portion 50B that are disposed on opposite sides of the continuous product 20. Similarly, the second rotary wheel electrode 52 includes a top wheel portion 52A and a bottom wheel portion 52B that are disposed on opposite sides of the continuous product 20. In certain embodiments involving continuous wire products, the rotary wheel electrodes 50 and 52 may be similar to rotary wheel electrodes used to electrify welding wire in arc welding systems. In other embodiments, the electrodes 50 and 52 may include only one rotary wheel portion (e.g., a single cylinder, like 50A or 52A). In still other embodiments, the electrodes 50 and 52 may be implemented as relatively fixed (e.g., non-rotating) electrodes that are dragged along the surface of the continuous product 20 as it advances through the thermal treatment system 42.

The electrodes 50 and 52 are generally made of a highly conductive material. For example, in certain embodiments, the electrodes 50 and 52 include silver, copper, aluminum, tungsten, or alloys thereof. More specifically, in certain embodiments, the electrodes 50 and 52 may be made from sintered compounds based on copper or silver, or from precipitation-enhanced alloys such as copper-beryllium. Additionally, in certain embodiments, the electrodes 50 and 52 may include an abrasion resistant material such as tungsten carbide to improve the longevity of the electrodes. Furthermore, the electrodes 50 and 52 generally are mounted on insulating blocks or insulating bearings 54 such that the electrodes 50 and 52 are electrically isolated from other portions of the thermal treatment system 42 to prevent interference with the operation of other portions of the continuous production system 40. It may also be noted that the radius 53 of the illustrated electrodes 50 and 52 may be tuned to adjust the amount of contact between the electrodes 50 and 52 and the continuous product 20, the resistance of the electrodes 50 and 52, or to achieve a desired rate of rotation for the electrodes 50 and 52. Furthermore, in certain embodiments, the distance 55 between the electrodes 50 and 52 may be fixed, may be manually varied (e.g., by an operator between manufacturing runs) or may be mechanically varied in an automated manner (e.g., by actuators under the direction of a controller, as discussed below).

As illustrated in FIG. 2, the electrodes 50 and 52 are electrically coupled to a power source 56 and are in electrical contact with the continuous product 20. As such, an electrical circuit is formed between the power source 56, the electrodes 50 and 52, and the portion 58 of the continuous product 20 disposed between the electrodes 50 and 52. The power source 56 is generally capable of applying an electrical bias across the electrodes 50 and 52 such that a current traverses and resistively heats the portion 58 of the continuous product 20 positioned between the electrodes 50 and 52. In certain embodiments, the power source 56 may be capable of controlling or varying the voltage and/or current output. For example, in certain embodiments, the power source 56 may be a welding power source (also referred to as a welding power supply) capable of providing a constant current/variable voltage output or a constant voltage/variable current output. While illustrated as being disposed outside of the housing 44, in other embodiments, the power source 56 may be disposed within the housing 44 of the thermal treatment system 42.

The thermal treatment system 42 illustrated in FIG. 2 also includes a gas supply system 60 that is coupled to the thermal treatment system 42. The gas supply system 60 is generally capable of providing one or more gas flow (e.g., inert gas flow, reactive gas flows, or combinations) to provide a controlled atmosphere near at least a portion of the continuous product 20 (e.g., within at least a portion of the housing 44). For example, in certain embodiments, the gas supply system 60 may include one or more gas cylinders, pressure regulators, flow regulation valves, compressors, or any other suitable components that may be used to deliver one or more gas flows near the continuous product 20. In certain embodiments, the gas flows may include nitrogen, argon, helium, oxygen, or combinations thereof. In certain embodiments, the gas supply system 60 may be a shielding gas supply system of a welding system, or a modified version thereof. In certain embodiments, the gas supply system 60 may provide a flow of inert gas near the continuous product 20 to limit or prevent oxidation or atmospheric contamination of the continuous product 20 during the heating portion and/or the cooling portion of the thermal treatment. In other embodiments, such as when the formation of an oxide layer (e.g., a glassy oxide coating) is desirable, the one or more gas flows provided by the gas supply system 60 may include oxygen to provoke oxidation of the continuous product 20.

Additionally, as illustrated in FIG. 2, in certain embodiments, the thermal treatment system 42 may include one or more gas nozzles 62 that receive at least a portion of the one or more gas flows provided by the gas supply system 16 and direct this portion of these gas flows toward one or more surfaces of the continuous product 20 (e.g., to provide a cooling or quenching effect). In other embodiments, the gas nozzles 62 may, additionally or alternatively, be positioned elsewhere within the housing 44 of the thermal treatment system 42 (e.g., within the heating zone 22, near the entrance 46, near the exit 48). By specific example, in certain embodiments, the one or more gas nozzles 62 may be positioned to provide a portion of the one or more gas flows toward the surface of the continuous product 20 within the heating zone 22, within the cooling zone 24, or within both the heating zone 22 and the cooling zone 24. Additionally, it may be appreciated that, in certain embodiments, regardless of positioning, the gas nozzles 62 may be capable of delivering a sufficient flow of inert gas to provide an inert atmosphere (e.g., sufficiently low oxygen and/or moisture content) within the entire housing 44 (e.g., within the heating zone 22 and the cooling zone 24). In certain embodiments, as mentioned below, the electrical bias may not be applied between the first and second electrodes 50 and 52 to begin resistive heating until the composition of the atmosphere near the continuous product 20 or within the housing 44 is suitable for thermal treatment (e.g., sufficiently inert to prevent oxidation of the surface of the continuous product 20, or sufficiently oxygen rich to provoke oxidation at the surface of the continuous product 20). Further, while illustrated as being disposed outside of the housing 44, in other embodiments, the gas supply system 60 may be disposed within the housing 44 of the thermal treatment system 42.

The continuous production system 40 includes a controller 64 that is capable of controlling operation of the thermal treatment system 42 as well as the processing system 12 and/or the packaging system 16. For example, the controller 64 may be a programmable logic controller (PLC) or another suitable controller having a memory 66 capable of storing instructions and a processor 68 capable of executing the instructions in order to control the operation of the continuous production system 40 (e.g., the processing system 12, the thermal treatment system 42, and/or the packaging system 16). As such, the illustrated controller 64 is communicatively coupled to the processing system 12, the packaging system 16, as well as components of the thermal treatment system 42, as illustrated by the dotted lines in FIG. 2. As such, for the illustrated embodiment, the controller 64 is generally capable of receiving signals indicative of the status of each of these systems, and capable of providing control signals to each of these systems to control operation of the continuous production system 40. It should be noted that the illustrated embodiment having a single controller 64 monitoring and controlling the operation of the continuous production system 40 is merely provided as one example. In other embodiments, the controller 64 may only monitor and control the operation of the thermal treatment system 42, and may report to, as well as receive instructions from, another controller controlling a larger portion of the continuous production system 40. For such embodiments, the controller 64 may be implemented as part of the thermal treatment system 42, and may even be included within the housing 44 of the thermal treatment system 42.

As illustrated in FIG. 2, in certain embodiments, the controller 64 is communicatively coupled to a number of components of the thermal treatment system 42. For example, in the illustrated embodiment, the controller 64 is communicatively coupled to both the power source 56 and to the gas supply system 60. As such, the controller 64 may receive signals indicative of one or more parameters from control circuitry and/or sensors of the power source 56 and/or the gas supply system 60, and may provide control signals to the power source 56 and/or the gas supply system 60 to modify these parameters. For the power source 56, these parameters may include, for example, an operational status (e.g., ON or OFF), a voltage setting, a current setting, a temperature, or an amount of voltage or current being applied by the power source 56, among other parameters. For the gas supply system 60, these parameters may include, for example, an operational status (e.g., ON or OFF), a pressure of a gas cylinder, a position of a gas regulator or valve, a pressure along a flow path, a gas flow rate, or an oxygen or moisture content within a gas flow, among other parameters.

Additionally, as illustrated in FIG. 2, the controller 64 may be communicatively coupled to one or more sensors 70 to monitor operation of the thermal treatment system 42. A non-limiting list of example sensors 70 includes displacement sensors that are capable of measuring the rate of advancement of the continuous product 20 through the thermal treatment system 42 and/or the distance 55 between the electrodes 50 and 52, voltage sensors that are capable of measuring an electrical bias between the electrodes 50 and 52, gas flow sensors capable of measuring a flow rate of gas entering the housing 44 or being released by the one or more gas nozzles 62, gas composition sensors (e.g., oxygen sensors, combustion sensors, carbon monoxide sensors, carbon dioxide sensors, moisture sensors) capable of measuring the composition of the atmosphere near the continuous product 20, among other types of sensors. In certain embodiments, the sensors 70 may include temperature sensors, such as pyrometers (e.g., infra-red (IR) thermometers), thermocouples, thermistors, or any other suitable temperature sensor capable of directly or indirectly measuring the temperature of the continuous product 20 at various points as it traverses through the thermal treatment system 42. In other embodiments, the one or more sensors 70 may not be present and the controller 64 may, instead, provide control signals that are based on operational parameters provided by an operator and/or operational parameters from a model that correlates potential parameters of the thermal treatment system 42 with potential temperature profiles for different continuous products 20.

As such, the measurements collected by the sensors 70 (e.g., temperature sensors) may be used by the controller 64 to determine the heating rate and the peak temperature of the portion 58 of the continuous product 20 positioned between the electrodes 50 and 52, as well as the temperature distribution across the continuous product 20. In certain embodiments, the controller 64 may adjust one or more parameters of the continuous production system 40 in order to provide uniform heating of the continuous product. For example, in certain embodiments, uniform heating may involve the controller 64 adjusting parameters of the system 40 to ensure that the average or peak temperatures experienced by different portions of the continuous product 20 vary by less than a particular amount (e.g., less than approximately 10% or less than approximately 5%) as the continuous product 20 traverses the heating zone 22. By specific example, in certain embodiments, the controller 64 may adjust the rate of advancement of the continuous product 20 through the thermal treatment system 44 to achieve the uniform heating in the portion 58 of the continuous product 20. However, since the thermal treatment system 42 is disposed inline with the processing system 12 and the packaging system 16, the rate of advancement of the continuous product 20 throughout the continuous production system 40 would be affected by such a change.

As such, in certain embodiments, the controller 64 may specifically adjust the parameters of the thermal treatment system 42 to achieve uniform heating of the continuous product 20 so that other parameters of the continuous production system 40 (e.g., the rate of advancement of the continuous product 20) may remain unchanged. For example, for the resistive heating thermal treatment system 42 illustrated in FIG. 2, the controller 64 may adjust the distance 55 between the electrodes 50 and 52, as well as the electrical bias and/or current between the electrodes 50 and 52, to achieve the uniform resistive heating without adjusting the rate of advancement of the continuous product 20. It may be noted that, in certain embodiments, the controller 64 may not signal the power source 56 to apply the electrical bias between the electrodes 50 and 52 until the rate of advancement of the continuous product 20 is above a threshold value, until the oxygen and/or moisture content of the atmosphere within the housing 44 is below a threshold value, or a combination thereof. In other embodiments, the controller 64 may signal the power source 56 to gradually increase the electrical bias between the electrodes 50 and 52 proportionally with the gradual increase in the rate of advancement of the continuous product 20.

Plasma Heating

In certain embodiments of the present approach, the thermal treatment system 14 of FIG. 1 may use plasma heating to thermally treat continuous products. Plasma heating, as used herein, refers to the use of an ionized gas, such as argon plasma, to thermally treat the continuous product. For embodiments of the thermal treatment system 14 that use plasma heating, at least one electrode and at least one corresponding target are placed near a continuous product such that, when a plasma arc is formed between the electrode and the corresponding target, the portion of the continuous product disposed near the plasma arc is rapidly heated. For the disclosed embodiments that utilize plasma heating, since the plasma arc is formed between the electrode and the target, this technique is applicable to both conductive and non-conductive continuous products.

Figure 3:
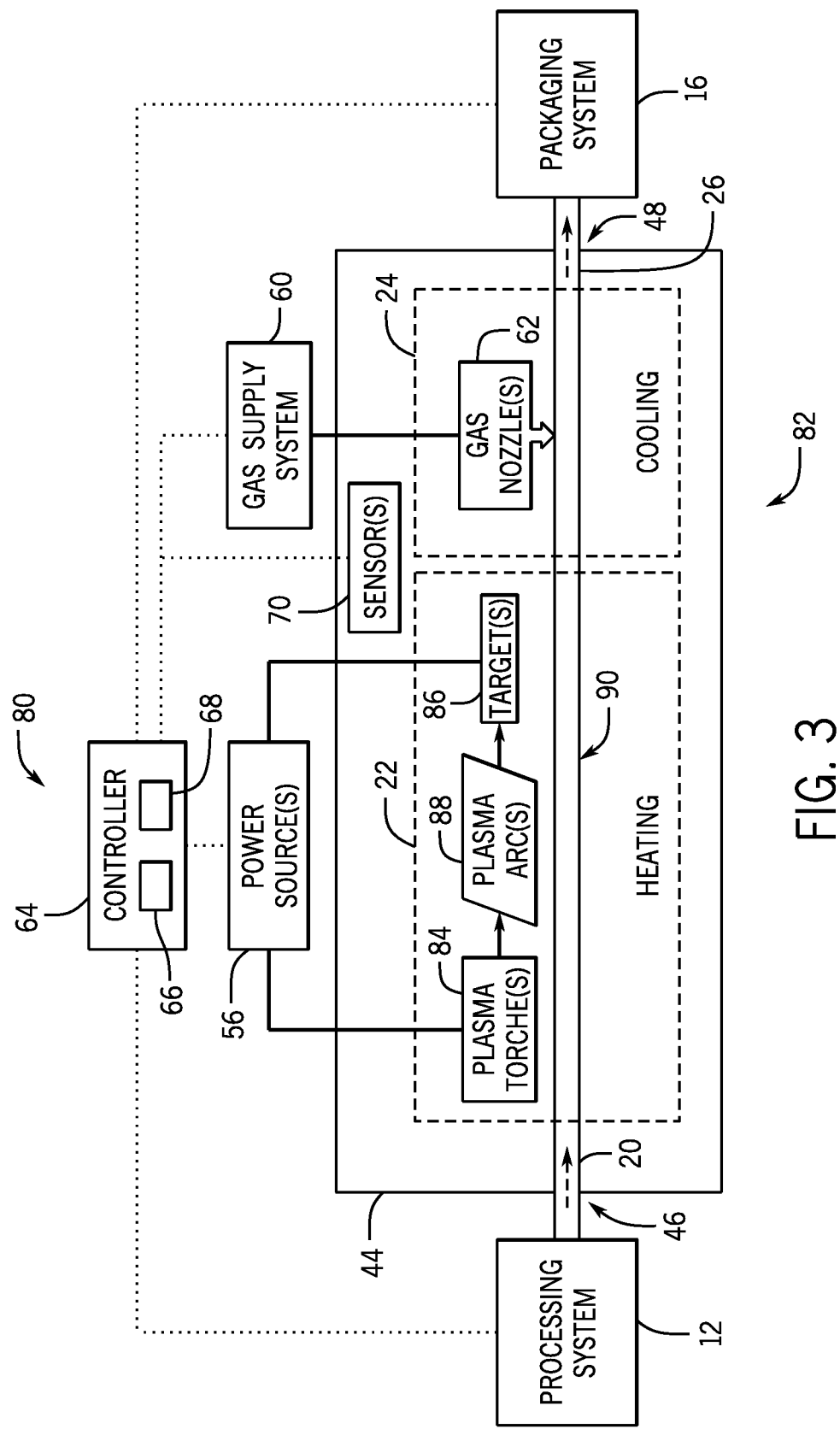
FIG. 3 is a schematic diagram illustrating a portion of a continuous production system having an inline plasma thermal treatment system, in accordance with embodiments of the present approach.

FIG. 3 is a schematic diagram illustrating a portion of a continuous production system 80 that includes an embodiment of an inline plasma thermal treatment system 82, in accordance with embodiments of the present approach. It may be appreciated that, in certain embodiments, the plasma thermal treatment system 82 includes several features (e.g., power source 56, gas supply system 60, controller 64, sensors 70, gas nozzles 70) similar to the resistive heating thermal treatment system 42 of FIG. 2, as discussed above. For brevity sake, differences between the plasma thermal treatment system 82 of FIG. 3 and the resistive heating thermal treatment system 42 of FIG. 2 are highlighted in the description below, while the remainder of the disclosure may be applicable to either embodiment.

The heating zone 22 of the plasma thermal treatment system 82 includes one or more plasma torches 84 and one or more corresponding targets 86 disposed within the housing 44. In other embodiments, the plasma thermal treatment system 82 may be implemented without the housing 44. The plasma torches 84 of the thermal treatment system 82 receive electrical power from one or more power sources 56 and a gas flow supplied by the gas supply system 60. For example, in certain embodiments, the plasma torches 84 may be modified versions of welding torches used in gas-tungsten arc welding (GTAW) or plasma welding. The plasma torches 84 each include an electrode (e.g., a non-consumable tungsten electrode) that is capable of ionizing a gas flow when a suitable electrical bias is applied between the electrode of a plasma torch 84 and the corresponding target 86. The targets 86 may be water-cooled copper blocks or other suitable electrically conductive targets capable of rapidly diffusing heat. In certain embodiments, the plasma torches 84 may be water-cooled as well. As such, the plasma torches 84 are each capable of forming a plasma arc 88 that rapidly heats the portion 90 of the continuous product 20 disposed near the plasma arcs 88.

The plasma torches 84 of FIG. 3 are illustrated as transferred arc plasma torches 84. For such plasma torches 84, initial pilot arcs may be established between an electrode and a gas nozzle of each of the plasma torches 84. While these pilot arcs are temporarily established, the one or more power sources 56 may apply increasing electrical bias between the electrode of the plasma torches 84 and the corresponding targets 86 to establish the plasma arcs 88. In other embodiments, the plasma torches 84 may be non-transferred arc plasma torches 84, the targets 86 may not be present, and the plasma arcs 88 may be formed between an electrode and a gas nozzle of the plasma torches 84. It may be appreciated that such embodiments that lack the targets 86 may be cheaper to build and easier to implement. However, it may also be appreciated that, in certain embodiments, using transferred arc plasma torches 84 and corresponding targets 86, as illustrated in FIG. 3, may provide greater control of the plasma arcs 88 during plasma heating.

It may also be appreciated that, unlike the resistive heating technique discussed above, the plasma arcs 88 may be capable of directly, chemically reacting with organic contaminates that may remain on the surface of the continuous product 20. Indeed, for continuous products in which an oxide layer (e.g., a glassy oxide coating) is desirable, such a layer may be formed when the atmosphere within the housing 44 (or within the gas flow received by the torches 84) is sufficiently reactive (e.g., contains sufficient oxygen). For other continuous products 20, however, an inert atmosphere may be maintained near the continuous product 20 (e.g., within at least a portion of the housing 44) to limit or prevent oxidation of the continuous product 20 during thermal treatment.

In certain embodiments, the gas flow provided to the plasma torches 84 (referred to herein as the plasma gas flow) may consist of argon, helium, or nitrogen, or combinations thereof, which are ionized to form the plasma arcs 88. Additionally, in certain embodiments, the gas flow provided to the one or more gas nozzles 62 of the plasma thermal treatment system 80 may have the same composition as the plasma gas flow while serving a different role as an inert gas or inert gas mixture. In other embodiments, the gas flows may have different compositions. For example, in certain embodiments, the gas flow provided to the one or more gas nozzles 62 may include a reactive gas (e.g., oxygen) directed toward one or more surfaces of the continuous product during and/or after plasma heating to facilitate particular reactions at the surface of the continuous product 20.

For the thermal treatment system 82, a number of parameters may be tuned by the controller 64 to achieve the desired heating (e.g., uniform heating rate, uniform peak temperature, and/or uniform temperature distribution) when thermally treating the continuous product 20. For example, the controller 64 may monitor and control the flow rate of the gas flow supplied to the plasma torches 84 by the gas supply system 60 and the electrical bias applied by the power sources 56 between the electrodes of the plasma torches 84 and the targets 84, which affects the power and the shape of each plasma arc 88. Additionally, the sensors 70 may include direct or indirect temperature sensing devices that are capable of measuring temperatures of the continuous product 20, the plasma arcs 88, or both. For example, the sensors 70 pyrometers that measure the temperature of portions of the continuous product 20 and/or the temperature of the plasma arcs 88. In certain embodiments, the sensors 70 may include cameras that measure the shape and the position of each plasma arc 88 relative to the continuous product 20.

In certain embodiments, the desired heating may be achieved by controlling the positions of the plasma torches 84 and the corresponding targets 86. For example, in certain embodiments, the positions of the plasma torches 84 and the targets 86 may be fixed, manually adjustable, or mechanically adjustable in an automated manner using actuators controlled by the controller 64. For example, the distance between a plasma torch 84 and the corresponding target 86 may be adjusted to control the temperature and the stability of the plasma arc 88. Additionally, the distance between the plasma torch 84 and the continuous product 20 as well as the radial and/or longitudinal position of the torch 84 may be adjusted to achieve the desired heating of the continuous product 20. It may be also noted that, in certain embodiments, the controller 64 may not signal the power sources 56 to apply the electrical bias between the torches 84 and the corresponding targets 86 until the rate of advancement of the continuous product 20 is above a threshold value, until the oxygen and/or moisture content of the atmosphere within the housing 44 is below a threshold value, or a combination thereof. In other embodiments, the controller 64 may signal the power sources 56 to gradually increase applied electrical bias to gradually increase the heat output of the torches 84 proportionally with the gradual increase in the rate of advancement of the continuous product 20.

With the foregoing in mind, FIGS. 4-8 are schematic diagrams illustrating various positions and orientations of multiple plasma arcs 88 in relation to the continuous product 20. It may be appreciated that the positions and orientations presented in FIGS. 4-8 are merely examples and that, in certain embodiments of the disclosed plasma thermal treatment system 82, other positions and orientations are possible. Additionally, in FIGS. 4-8, the position of a plasma torch 84 is represented by the position of its electrode 92 and generated plasma arc 88 directed toward its respective target 86, while the remainder of the plasma torch 84, including various gas flow paths, nozzles, electrical connections, etc., is omitted for simplicity and clarity. Additionally, it may be appreciated that, while the various electrodes 92, the targets 86, the plasma arcs 88 in FIG. 4-8 are illustrated as having a particular shape, these are merely provided as simplified, non-limiting examples, and in other embodiments, other shapes are possible.

FIG. 4 illustrates the positioning of various plasma sources about the surfaces of the continuous product 20 for an example embodiment of the plasma thermal treatment system 82. In FIG. 4, a first electrode 92A and target 86A are disposed on a first side (e.g., above) the continuous product 20, and a first plasma arc 88A extends between the two. A second electrode 92B and target 86B are disposed on a second, opposite side (e.g., below) the continuous product 20, and a second plasma arc 88B extends between the two. Additionally, the plasma arcs 88A and 88B are longitudinally oriented (i.e., extend along the length and the direction of motion of the continuous product 20) and heat the portion 90 of the continuous product 20 nearest the plasma arcs 88A and 88B. In certain embodiments, the plasma arcs 88A and 88B may be aligned substantially parallel to the direction of motion of the continuous product 20. In other embodiments, the plasma arcs 88A and 88B may be offset such that the plasma arcs 88A and 88B are generally longitudinally oriented (e.g., the length of the plasma arcs 88A and 88B generally extend along the direction of motion of the continuous product 20) but are not disposed exactly parallel (e.g., offset by 45 degrees or less) relative to the direction of motion of the continuous product 20. In other embodiments, any number of additional electrodes 92 and corresponding targets 86 may be disposed above and below the continuous product 20 to provide the desired heating to the portion 90 of the continuous product 20.

In other embodiments, the plasma arcs 88 may have a transverse orientation with respect to the length and the motion of the continuous product 20. FIGS. 5-8 illustrate front (e.g., cross-sectional) views of an example continuous wire product 20 having various transversely oriented plasma sources about the surfaces for an example embodiment of the plasma thermal treatment system 82. It may be appreciated that, while the orientation of the plasma arcs 88 illustrated in FIGS. 5-8 are disposed transverse (e.g., perpendicular) with respect to the length and motion of the continuous product 20, in other embodiments, the plasma arcs 88 may be offset (e.g., not exactly perpendicular) without negating the effect of the present approach.

Figure 6:
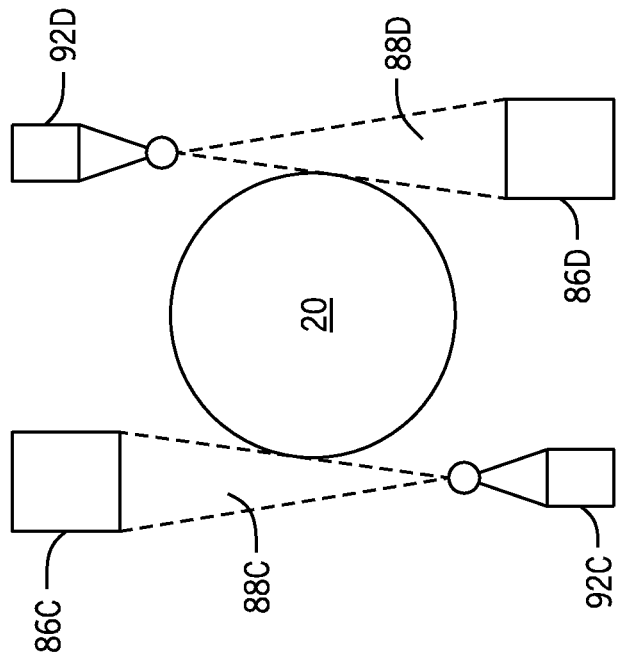
Figure 5:
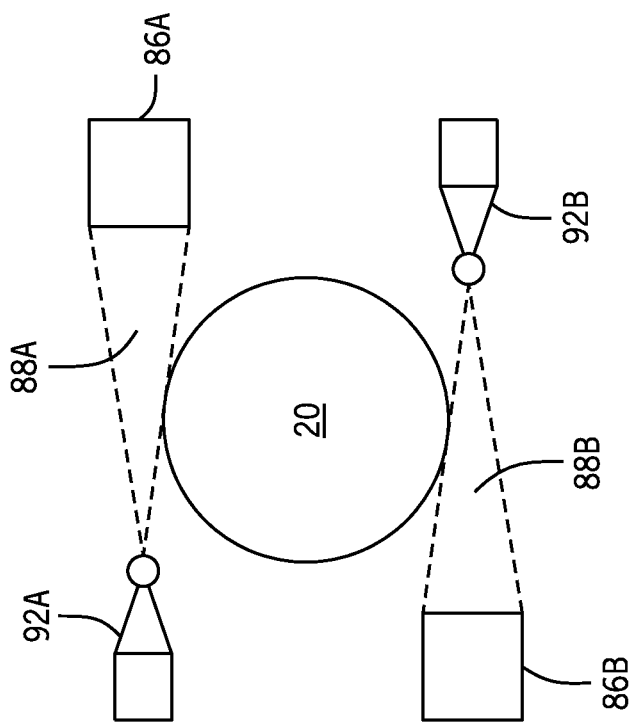

In particular, FIGS. 5 and 6 illustrate two different front views of the example continuous wire product 20 at different points within the heating zone 22 of the plasma thermal treatment system 82 (as illustrated in FIG. 3) having transversely oriented plasma arcs 88. In the view illustrated in FIG. 5, a first electrode 92A and target 86A are disposed on a first side of (e.g., above) the continuous product 20, and a first plasma arc 88A extends between the two. A second electrode 92B and target 86B are disposed on a second, opposite side of (e.g., below) the continuous product 20, and a second plasma arc 88B extends between the two. In the view illustrated in FIG. 6, a third electrode 92C and target 86C are disposed on a third side (e.g., to the left) of the continuous product 20, and a third plasma arc 88C extends between the two. Further, in FIG. 6, a fourth electrode 92D and target 86D are disposed on a fourth, opposite side (e.g., to the right) of the continuous product 20, and a fourth plasma arc 88D extends between the two.

Figure 7:
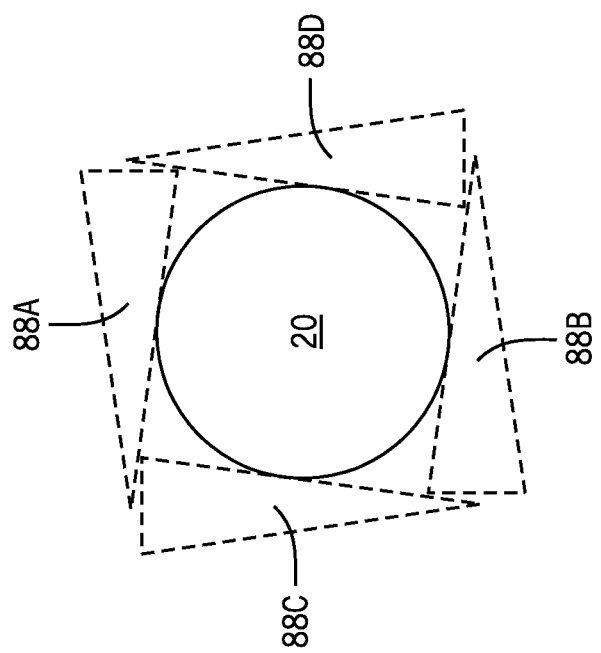

As such, for the example illustrated in FIGS. 5 and 6, as the continuous wire product 20 advances through the heating zone 22 of the plasma thermal treatment system 82, first the top and the bottom sides of the continuous wire product 20 are exposed to a portion of the plasma arcs 88A and 88B, respectively, as illustrated in FIG. 5. Subsequently, the left and right sides of the continuous wire product 20 are exposed to a portion of the plasma arcs 88C and 88D (as illustrated in FIG. 6). Accordingly, FIG. 7 is a front view of the continuous product 20 from the example of FIGS. 5 and 6 illustrating the relative positions of the plasma arcs 88A-D (with the electrodes 92A-92D and targets 86A-86D omitted for clarity). As such, FIG. 7 illustrates that most of the surface of the continuous wire product 20 is disposed near at least one of the plasma arcs 88A-88D to provide effective heating of the continuous wire product 20.

Figure 8:
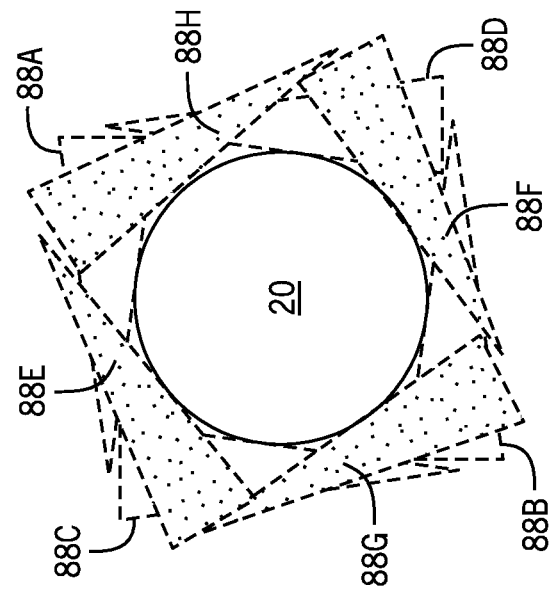

FIG. 8 is a front view of the continuous product 20, as illustrated in FIG. 7, but with an additional four plasma arcs 88E, 88F, 88G, and 88H whose positions are radially offset relative to the positions of the initial four plasma arcs 88A-88D. As such, FIG. 8 illustrates that, using additional plasma arcs (e.g., disposed in the heating zone 22 downstream of the initial four plasma arcs 88A-88D), an even greater portion most of the surface of the continuous wire product 20 is disposed near at least one of the plasma arcs 88A-88H to provide effective heating of the continuous wire product 20. It may be appreciated that, in certain embodiments, the surface coverage illustrated in FIGS. 7-8 may be achieved using fewer plasma arcs 88 that move (e.g., change radial position, rotate) about the surface of the continuous wire product 20 as it advances through the heating zone 22 of the plasma thermal treatment system 82.

Laser Heating

In certain embodiments of the present approach, the thermal treatment system 14 of FIG. 1 may use laser heating to thermally treat continuous products. Laser heating, as used herein, refers to rapidly heating a continuous product by irradiating the continuous product with a coherent light source, such as a laser. For embodiments of the thermal treatment system 14 that use laser heating, at least one laser irradiates a surface of the continuous product to provide a rapid heating effect. The disclosed laser heating technique is applicable to both conductive and non-conductive continuous products.

FIG. 9 is a schematic diagram illustrating a portion of a continuous production system 100 that includes an embodiment of an inline laser thermal treatment system 102, in accordance with embodiments of the present approach. It may be appreciated that, in certain embodiments, the laser thermal treatment system 102 includes several features (e.g., gas supply system 60, controller 64, sensors 70, gas nozzles 70) similar to the resistive heating thermal treatment system 42 of FIG. 2, as discussed above. For brevity sake, differences between the laser thermal treatment system 102 of FIG. 9 and the resistive heating thermal treatment system 42 of FIG. 2 are highlighted in the description below, while the remainder of the disclosure may be applicable to either embodiment.

The heating zone 22 of the laser thermal treatment system 102 includes one or more lasers 104 disposed within the housing 44. Compared to the thermal treatment systems discussed above, the laser thermal treatment system 102 may benefit more from the housing 44 to protect the optical components of the system as well as to limit laser light leakage to the surrounding environment. The lasers 104 of the laser thermal treatment system 102 receive electrical power from one or more suitable laser power sources 106. In certain embodiments, the lasers 104 may also receive a cooling gas flow supplied by the gas supply system 60, as illustrated in FIG. 9. In other embodiments, the lasers 104 may be water-cooled or may be actively or passively cooled using the atmosphere within the housing 44. In certain embodiments, the temperature of the lasers 104 may be directly or indirectly measured to prevent overheating of the lasers 104 during thermal treatment. In certain embodiments, the lasers 104 and the power sources 106 may be modified versions of lasers and power sources used in laser welding.

When power is supplied to the lasers 104, beams of laser light 108 are emitted that impinge on one or more surfaces of the continuous product 20, rapidly heating the portion 110 of the continuous product 20 impinged by the laser light 108. Since the frequency range of the laser light 108 may affect the heating of the continuous product 20, the frequency range of the laser 104 may be selected at a frequency readily absorbed by the surface of the continuous product 20 to promote heating. Further, in certain embodiments, the laser light 104 produced by the lasers 104 may be either pulsed or continuous.

For the laser thermal treatment system 102, a number of parameters may be tuned by the controller 64 to achieve the desired heating (e.g., uniform heating rate, uniform peak temperature, and/or uniform temperature distribution) when thermally treating the continuous product 20. For example, the controller 64 may monitor and control the average and peak power supplied by the power sources 106 to the lasers 104 and/or the average and peak intensity of the laser light 108 emitted by the lasers 104 to achieve the desired heating of the continuous product 20. For embodiments in which the lasers 104 are tunable, the sensors 70 may include spectral sensors and the controller 64 may monitor and control the frequency of the emitted laser light 108 based on measurements performed by the sensors 70. For embodiments in which the lasers 104 are pulsed lasers, the controller 64 may monitor and control the pulsing frequency of the emitted laser light 108. Further, it may be noted that, in certain embodiments, the controller 64 may not signal the power sources 106 to supply power to the lasers 104 until the rate of advancement of the continuous product 20 is above a threshold value, until the oxygen and/or moisture content of the atmosphere within the housing 44 is below a threshold value, or a combination thereof. In other embodiments, the controller 64 may signal the power sources 106 to gradually increase the power supplied to the lasers 104 proportionally with the gradual increase in the rate of advancement of the continuous product 20.

In certain embodiments, the desired heating may be achieved by controlling how the laser light 108 impinges on the surfaces of the continuous product 20. In certain embodiments, the positions of the lasers 104 and/or any number of beam control features (e.g., mirrors, deflectors, diffusers, lenses, filters, etc.) may be fixed, manually adjustable, or mechanically adjustable in an automated manner using actuators controlled by the controller 64. These beam control features may generally be capable of adjusting the direction, shape, and/or focus of the laser light 108. For example, in certain embodiments, the controller 64 may monitor and control the positions of the lasers 104 and/or one or more beam control features to provide the desired heating of the continuous product 20. By specific example, the controller 64 may adjust the respective distances between the lasers 104 and the surface of the continuous product 20. Additionally, the radial and/or longitudinal position of the lasers 104 with respect to the continuous product 20 may be also be adjusted to achieve the desired heating of the continuous product 20.

FIGS. 10 and 11 are schematic diagrams illustrating various example positions and orientations of the beams of lasers light 108 in relation to a continuous wire product 20. It may be appreciated that the positions, orientations, and beam shapes presented in FIGS. 10 and 11 are merely non-limiting examples. Additionally, in FIGS. 10 and 11, lasers 104 are represented as arrows for simplicity. It may be appreciated that, in other embodiments, surface coverage similar to what is illustrated in FIGS. 10 and 11 may be achieved using fewer lasers 104 (e.g., a single laser) and one or more suitably positioned beam control features (e.g., beam deflector or reflector). For such embodiments, the arrows 104 may instead represent the position of a beam control feature, such as a beam deflector or reflector, and the laser light 108 may be deflected or reflected laser light 108 from one or more lasers 104 toward the surfaces of the continuous product 20. It may also be appreciated that, in certain embodiments, the surface coverage illustrated in FIGS. 10 and 11 may be achieved using beams of laser light 108 that move (e.g., change radial position, rotate, and so forth) about the surface of the continuous wire product 20 as it advances through the heating zone 22 of the laser thermal treatment system 102.

With the foregoing in mind, FIGS. 10 and 11 illustrate front (e.g., cross-sectional) views of the example continuous wire product 20 having various lasers 104 disposed about the surfaces of the continuous wire product 20, in accordance with embodiments of the laser thermal treatment system 102. For the embodiment illustrated in FIG. 10, a first laser 104A is disposed on a first side of (e.g., above) the continuous product 20 and impinges the continuous product 20 with the laser beam 108A. A second laser 104B is disposed on a second, opposite side of (e.g., below) the continuous product 20 and impinges the opposite side of the continuous product 20 with the laser beam 108B. In other embodiments, any number of beams of laser light 108 may be disposed about the surfaces of the continuous product 20 to provide the desired heating to the portion 110 of the continuous product 20. It may be appreciated that, in certain embodiments, uniform heating may be achieved by impinging the entire exposed surface (e.g., an entire circumferential cross-sectional area) of the continuous product 20 with one or more laser beams 108, as illustrated in FIGS. 10 and 11.

The beams of laser light 108A and 108B illustrated in FIG. 10 are relatively diffuse laser beams, meaning that the illustrated beams of laser light 108A and 108B grow in size and volume (e.g., spread out) with increasing distance from the lasers 104A and 104B, respectively. As such, the resulting beams of laser light 108A and 108B may be substantially conical (for lasers 104 having a round aperture) or substantially rectangular pyramidal (for lasers 104 having a rectangular or slit aperture) in shape. As illustrated in FIG. 10, the two relatively diffuse laser beams 108A and 108B are able to impinge most or the entire surface of the continuous wire product 20. However, it may be appreciated that, as the laser beams 108A and 108B expand, the amount of energy delivered to the impinged surface of the continuous wire product 20 per unit area (i.e., the fluence) of the laser beams 108A and 108B decreases. As such, for the embodiment illustrated in FIG. 10, the lasers 104A and 104B should be sufficiently powerful (e.g., have sufficiently high total fluences) such that the laser beams 108A and 108B still have a sufficiently high fluence to heat the continuous product 20 after being diffused.

For the embodiment illustrated in FIG. 11, four lasers 104A, 104B, 104C, and 104D are radially positioned about the continuous wire product 20, approximately 90 degrees apart, each impinging most or the entire surface of the continuous wire product 20 with a respective beam of laser light 108A, 108B, 108C, and 108D. Since the beams of laser light 108A-108D are more focused, the beams of laser light 108A-108D have a relatively constant size and volume (e.g., do not spread out) with increasing distance from the respective lasers 104A-104D. It may be appreciated that since the laser beams 108A-108D do not substantially expand or diffuse, the amounts of energy delivered to the impinged surface of the continuous wire product 20 per unit area (i.e., the fluences) of the laser beams 108A-108D is relatively constant with increasing distance from the lasers 104A-104D. As such, unlike the embodiment illustrated in FIG. 10, for the non-diffuse lasers 104A-104D of FIG. 11, the distance between the lasers 104A-104D and the surface of the continuous product 20 does not dramatically affect the heating of the continuous product 20. Additionally, for the embodiment illustrated in FIG. 11, the lasers 104A-104D may be lower in power (e.g., lower in fluence) than the diffuse lasers 104A and 104B of FIG. 10, while providing a similar heating effect.

The technical effects of the presently disclosed embodiments include the inline, rapid thermal treatment of continuous products. The presently disclosed thermal treatment systems afford numerous advantages over batch thermal treatment processes in terms of time and cost. For example, disclosed embodiments of the thermal treatment system are effective to clean organic materials from the surfaces of the continuous product, to dry the continuous product of moisture or solvent, and/or to produce phase changes or chemical reactions within or on the surface of the continuous product. Furthermore, in certain embodiments, the disclosed thermal treatment system may utilize resistive heating, plasma heating, or laser heating to uniformly heat a variety of different continuous products during thermal treatment. As such, the disclosed thermal treatment system embodiments enable the direct, inline thermal treatment of a variety of conductive or non-conductive continuous products in a cost effective manner.

While only certain features of the technique have been illustrated and described herein, many modifications and changes will occur to those skilled in the art. It is, therefore, to be understood that the appended claims are intended to cover all such modifications and changes as fall within the true spirit of the invention.

The invention claimed is:

1. An inline thermal treatment system for thermally treating a continuous product, comprising:
   a housing comprising a first opening and second opening respectively configured to allow the continuous product to enter and to exit the housing; and
   at least one laser coupled to a laser power source and configured to output a plurality of laser beams, a first beam of the plurality of beams to impinge upon and heat a first surface of a portion of the continuous product and a second beam of the plurality of beams to impinge upon and heat a second surface of the portion.

2. The thermal treatment system of claim 1, comprising one or more beam control features disposed within the housing between the at least one laser and the portion of the continuous product, wherein the one or more beam control features are configured to modify a direction, shape, and/or focus of the plurality of laser beams before the plurality of laser beams impinge upon the portion of the continuous product.

3. The thermal treatment system of claim 1, comprising a controller having a memory and a processor, wherein the controller is configured to control operation of the thermal treatment system based on instructions stored in the memory to achieve uniform heating of the continuous product.

4. The thermal treatment system of claim 3, wherein the controller is configured to control an amount of power supplied to the at least one laser by the laser power source, a longitudinal and/or radial position of the plurality of laser beams relative to the portion of the continuous product, a shape and/or focus of the plurality of laser beams, a wavelength of the plurality of laser beams, or a pulsing frequency of the at least one laser, or a combination thereof.

5. The thermal treatment system of claim 3, comprising one or more sensors communicatively coupled to the controller and configured to measure a temperature of the continuous product directly or indirectly, a temperature of the at least one laser directly or indirectly, the amount of power supplied to the at least one laser by the laser power source, the longitudinal and/or radial position of the plurality of laser beams relative to the portion of the continuous product, the wavelength of the plurality of laser beams, the pulsing frequency of the at least one laser, the shape and/or focus of the plurality of laser beams, or the composition of the atmosphere near the continuous product, or a combination thereof.

6. The thermal treatment system of claim 1, wherein the plurality of laser beams are configured to impinge upon an entire circumferential cross-sectional area of the portion of the continuous product simultaneously as the portion of the continuous product traverses the thermal treatment system.

7. The thermal treatment system of claim 1, comprising a gas supply system configured to supply one or more gas flows to one or more gas nozzles of the thermal treatment system, wherein the one or more gas nozzles are configured to direct at least a portion of the one or more gas flows near one or more surfaces of the continuous conductive product during and/or after laser heating.

8. The thermal treatment system of claim 7, wherein the gas supply system is configured to supply at least a portion of the one or more gas flows to the at least one laser to cool the at least one laser.

9. The thermal treatment system of claim 7, wherein the one or more gas flows comprise an inert gas flow.

10. The thermal treatment system of claim 9, wherein the one or more gas nozzles are configured to direct at least the portion of the one or more gas flows near the one or more surfaces of the continuous conductive product to cool the one or more surfaces of the continuous conductive product after resistive heating.

11. The thermal treatment system of claim 1, wherein the continuous product comprises a continuous plate, solid wire, tubular wire, strip, or sheet.

12. The thermal treatment system of claim 11, wherein the continuous product is non-conductive.

13. The thermal treatment system of claim 1, wherein the first surface and the second surface are on opposite sides of the continuous product.

14. The thermal treatment system of claim 1, wherein the portion of the continuous product has a circumferential cross-sectional area, and wherein the plurality of laser beams impinge upon and heat respective opposing exposed surfaces of the circumferential cross-sectional area of the continuous product.

15. A continuous production system for manufacturing a continuous product, comprising:
   an inline production system within a housing comprising a first opening configured to receive a continuous material and a second opening configured to output a continuous product from the housing:
   wherein the inline production system comprises an inline thermal treatment system configured to receive the continuous material and to output a thermally treated continuous product, wherein the inline thermal treatment system comprises:
- at least one laser disposed within the housing and configured to produce a plurality of laser beams, wherein the plurality of laser beams are configured to impinge upon and heat first and second surfaces of a portion of the continuous product; and
- a controller comprising a memory and a processor, wherein the controller is configured to control the inline production system and the inline thermal treatment system based on instructions stored in the memory.

16. The continuous production system of claim 15, wherein the inline thermal treatment system comprises one or more sensors communicatively coupled to the controller, wherein the one or more sensors are configured to measure a temperature of the continuous product directly or indirectly, a temperature of the at least one laser directly or indirectly, an amount of power supplied to the at least one laser, a longitudinal and/or radial position of the plurality of laser beams relative to the portion of the continuous product, a shape and/or focus of the plurality of laser beams, a wavelength of the plurality of laser beams, or a pulsing frequency of the at least one laser, or the composition of the atmosphere near the continuous product, or a combination thereof.

17. The continuous production system of claim 15, comprising a packaging system configured to receive the thermally treated continuous product from the inline thermal treatment system and to package the thermally treated continuous product.

18. The continuous production system of claim 15, wherein the inline thermal treatment system comprises one or more gas nozzles configured to direct at least a portion of a gas flow toward a surface of the continuous conductive product during and/or after laser heating.

19. The continuous production system of claim 18, wherein the gas flow is a reactive gas flow.

20. The continuous production system of claim 15, wherein the inline thermal treatment system comprises a laser welding power source configured to supply power to the at least one laser.

21. The continuous production system of claim 15, wherein the at least one laser comprises four lasers, each laser oriented radially about the continuous product to direct a respective laser beam of the plurality of laser beams to impinge on a respective exposed surface of the continuous product simultaneously as the portion of the continuous product traverses the thermal treatment system.

* * * * *